United States Patent [19]

Coquerel

[11] Patent Number: 4,612,956
[45] Date of Patent: Sep. 23, 1986

[54] SAFETY HOLE FORMING A GASEOUS PRODUCT PREVENTIVE SIPHON

[75] Inventor: Claude Coquerel, Grentheville, France

[73] Assignee: Equipement Industriel Normand, Grentheville, France

[21] Appl. No.: 691,063

[22] Filed: Jan. 14, 1985

[30] Foreign Application Priority Data

Jan. 25, 1984 [EP] European Pat. Off. ........ 84400167.7

[51] Int. Cl.[4] .................. F16K 31/02; F16K 37/00
[52] U.S. Cl. .................................. 137/386; 137/392; 137/551; 137/312; 73/40.5 R; 141/83; 141/198; 340/620
[58] Field of Search ............. 137/312, 363, 386, 392, 137/551; 73/40.5 R; 141/83, 94, 95, 96, 198; 340/620; 307/118; 361/178

[56] References Cited

U.S. PATENT DOCUMENTS

| | | | |
|---|---|---|---|
| 3,191,427 | 6/1965 | Rapson, Jr. ............... | 73/40.5 R |
| 3,261,201 | 7/1966 | Pottash ...................... | 73/40.5 R |
| 3,273,753 | 9/1966 | Johnson et al. ............ | 73/40.5 R |
| 3,276,247 | 10/1966 | Bunn ......................... | 73/40.5 R |
| 3,439,837 | 4/1969 | Hearn et al. ............... | 73/40.5 R |
| 4,261,204 | 4/1981 | Donaldson ................. | 73/40.5 R |
| 4,368,636 | 1/1983 | Thorn et al. ............... | 73/40.5 R |

FOREIGN PATENT DOCUMENTS 688282 8/1930 France .

Primary Examiner—George L. Walton
Attorney, Agent, or Firm—Browdy & Neimark

[57] ABSTRACT

The safety hole is placed between equipments for forming a gaseous product preventive siphon. The safety hole comprises a vat, a cover closing the vat and being centrally provided with a vertical partition wall having a bottom portion placed at a determined height from bottom of the vat. The vat is filled with a neutral liquid at a level substantially higher than the bottom portion of the vertical partition wall thus forming an aqueous compartment and a downstream compartment.

3 Claims, 2 Drawing Figures

SAFETY HOLE FORMING A GASEOUS PRODUCT PREVENTIVE SIPHON

FIELD OF THE INVENTION

It is known that great amounts of flammable products are handled in stations provided for delivering fuel to automobile vehicles, in industrial equipments using hydrocarbon and more or less volatile solvent products, in factories manufacturing such solvent products, in places provided for loading tank trucks, in various refueling stations, in refineries, and in similar equipments.

BACKGROUND OF THE INVENTION

Yet, the above equipments necessarily comprise storage areas, either for liquid hydrocarbons (fuels, solvent and similar products), or for liquefied gaseous hydrocarbons. For transporting such dangerous products from one site to another of the storage areas and for counting such dangerous products, it has been necessary to use units comprising various pumps and measuring apparatus which are electrically supplied through a plurality of cables from one of more panels placed in premises which can be a particular building of a plant, or still a kiosk or a boutique for stations open to the public.

These equipments are particularly complicated in self-service delivery stations since it then exists all a transmission net through a plurality of cables connecting together the delivery apparatus to the central unit situated in the boutique or kiosk.

As this is well known, each delivery station necessitates to be connected to tubes for the products to be delivered as well as to supply cables and transmission cables for transmitting information given by each pumping and measuring unit.

In order to design units having a nice appearance, all these cables are placed under the ground in passages, ducts, sheaths, or sleeves and nozzles of sizes corresponding to the number of cables and their respective cross sections.

There is already known to provide from place to place junction holes and cable pulling holes in order to permit changes in direction of the nests or a control of the cables when cables of great lengths are used between the delivery stations and the central station.

The corresponding equipments make to communicate through an underground nest of cables, each pumping and measuring apparatus comprising at least one electric motor, with a general control cabinet in premises where is permanently placed an agent looking after at least one central display unit in case of self service, but in these premices there also exists for the comfort of the staff, some gaseous product protected apparatus for example electrical heating apparatus, convectors or air-conditioners.

However, despite all the protections which are taken, it may come that leakages or seepages are produced along the pipes or fittings of the hydraulic part within the delivery station containing the pumping and measuring unit.

The products being extremely volatile, it happens that gaseous products can very rapidly accumulate in the above mentioned holes, passages and ducts or in the sheaths sleeves and nozzles, and, thus, these gaseous products will come to the control premises.

There is therefore very rapidly made an explosive mixture which is very dangerous not only because its toxicity but above all because of blasting risks in case of a flame, an electrical contact making a spark, a hot point and even any static electrical charge able to be produced on the ground surface around the station.

The result is obviously an explosion of the explosive mixture with sometimes accidents on people.

INFORMATION DISCLOSURE STATEMENT

The present invention has for its object to remedy with the above mentioned problems by creating a safety hole forming a gaseous product preventive siphon for avoiding an accumulation of dangerous explosive mixtures.

BRIEF DESCRIPTION OF KNOWN PRIOR ART

French Patent 688,282 to SIEMENS-SCHUCKERTWERKE AG shows a seal tight hole communicating with various ducts, this seal-tight hole being closed by a cover permitting a junction by means of a pipe with a moto-pumpcompressor unit, either for vacuum aspirating or for pressure pushing the dangerous gaseous products in order to enable workers to work in the hole after a suitable aeration.

SUMMARY OF THE INVENTION

The invention provides a safety hole forming a gaseous product preventive siphon comprising a vat having a bottom and a top, a cover closing the top of said vat, a vertical partition wall provided centrally to said cover, said vertical partition wall having a bottom portion placed at a determined height from the bottom of the vat, an electrically neutral liquid in the vat at a level higher than level of the bottom portion of said vertical partition wall, thereby forming within the vat a first and a second compartments completely isolated respectively together, connecting electric cables for connecting together measuring and delivering stations to at least one central unit being provided to pass from the first to the second compartments between said bottom portion of the vertical partition wall and said bottom of the vat, safety means being further placed in at least one of the first and second compartments for detecting any explosive mixture and for controlling the level of the neutral liquid.

According to another feature of the invention, the upper part of the vat has an enlarged rim provided to support a periphery of the cover in order to seal the vat.

Various other features of the invention will further be revealed from the following detailed description.

BRIEF DESCRIPTION OF THE DRAWINGS

An embodiment of the invention is shown as a non limitative example, in the accompanying drawings, wherein.

DESCRIPTION OF THE PREFERRED EMBODIMENT

Figure 1:
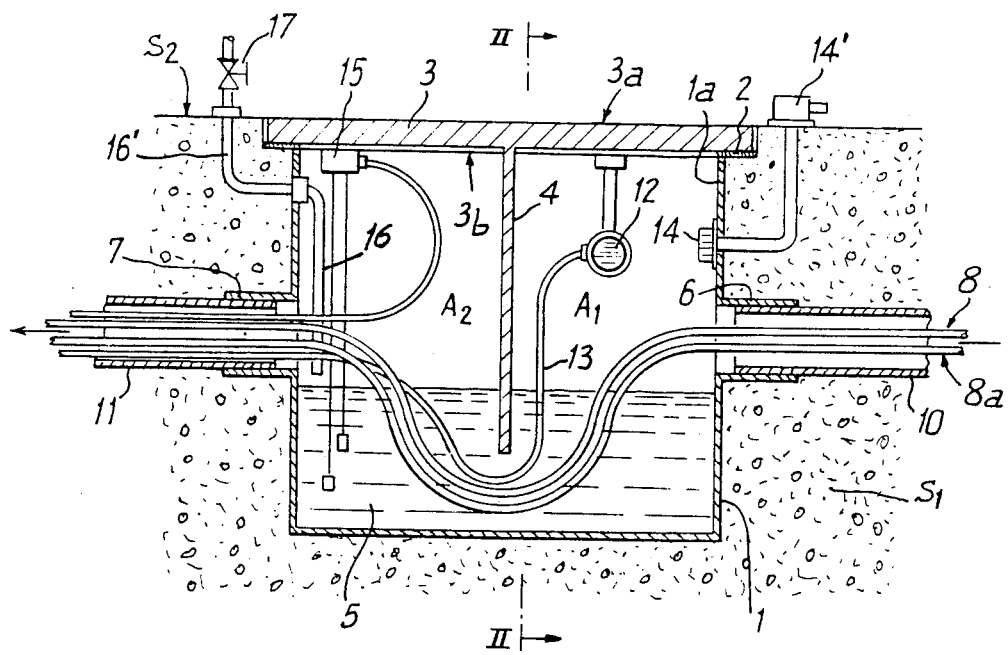
FIG. 1 is a cross-elevation section showing a safety hole forming a gaseous product preventive siphon according to the invention.

In FIG. 1, a vat 1 of substantially parallelepipedic shape and rectangular cross-section is buried into a ground $S_1$ so that an upper part 1a of the vat 1, which comprises an enlarged rim 2, is flush with surface $S_2$ of the ground $S_1$.

The rim 2 is provided for receiving a cover 3 of a shape corresponding exactly to that of the rim 2, and the upper side 3a of the cover 3 is exactly at the level of the ground $S_2$.

The lower part 3b of the cover 3 carries a vertical partition wall 4 dividing the vat 2 into two compartiments, an upstream compartment A1 and a downstream compartment A2. Length of the vertical partition wall 4 is smaller than depth of the vat 1, but width of the partition wall 4 is the same as width of the vat 1 in order to provide, when the cover 3 is positioned on the vat 1, a seal-tight division of the compartments A1 and A2 since the vat 1 contains, in its lower part, an electrically neutral liquid 5 into which is immersed the lower part of the partition wall 4, with the neutral liquid 5 coming at a level substantially higher than the bottom portion of the vertical partition wall 4.

The neutral liquid 5 is generally taken among a liquid glycerin, and an antifreeze product, and can for example be a mixture of water and glycocol, or monoethylene glycocol. It is also possible to use a neutral oil used in electrical transformers. In any case, the neutral liquid 5 must have a freezing point as low as possible in order to be liquid even at low winter temperatures.

Figure 2:
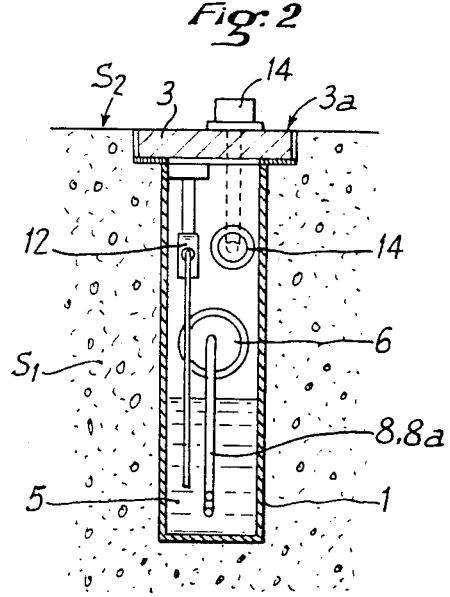
FIG. 2 is a cross-section of FIG. 1 taken along line II—II of FIG. 1.

As shown in FIGS. 1 and 2, the vat 1 comprises an inlet extension 6 and an outlet extension 7 which are both placed at the median zone of the vat 1 and which are provided for passage of electric cables 8, 8a connecting together pumping and measuring stations with various control units. As shown in the drawings, the cables 8, 8a enter the vat 1 through the extension 6, pass under the partition wall 4 in the neutral liquid 5, for coming out from the vat 1 through the outlet extension 7.

The extensions 6 and 7 are besides extended by various ducts 10, 11 preventing the cables 8, 8a, ... to come into contact with the ground S1.

It should be noted that some noxious and explosive gaseous material can possibly enter the upstream compartment A1 from the measuring station through the duct 10. In order to detect the presence of the explosive gaseous material, the upstream compartment A1 of the vat 1 comprises an explosion detector 12 for detecting explosive gaseous mixtures, the explosion detector 12 being connected by a cable 13 to a corresponding control unit. There is also provided a venting device which is actuated conventionally, i.e. by pressure, forming part of safety member 14' which normally permits a release in the atmosphere of the noxious gaseous products.

In the downstream compartment A2, a level detector 15 is provided for checking height of the neutral liquid 5 in the vat 1 and, a tube 16 extended by a tube 16' connected to a valve 17 that is operated manually or operated by an electrical means (not shown) connected to the level detector 15 to introduce some more neutral liquid 5 in the vat 1 when the level detector 15 shows that there is not enough liquid in the vat 1 (for example, because of evaporation of the liquid or because the vat is porous).

In the above mentioned embodiment, the vat 1 is of a rectangular cross section, but the vat 1 could have any other cross sectional shape if this was necessary.

The ground S1 is generally made by a sheet of reinforced concrete and the vat 1 which is buried in the ground S1, as well as the cover 3 and the partition wall 4 are each made of anti-corrosion and very-resisting materials.

The safety detector 12 enables a visual alarm to be triggered in case of increased pressure due to the presence of an explosive mixture, and is therefore provided as a second safety means since noxious gaseous mixture should normally escape toward the atmosphere by the venting device 14.

As shown above, the level detector 15 provides, from a predetermined level of the neutral liquid, a good efficacity and a good working of the safety hole forming a gaseous product preventive siphon according to the invention.

I claim:

1. A safety hole forming a gaseous product preventive siphon comprising a vat having a bottom and a top, a cover closing the top of said vat, a vertical partition wall provided centrally to said cover, said vertical partition wall having a bottom portion placed at a determined height from the bottom of the vat, an electrically neutral liquid in the vat at a level higher than level of the bottom portion of said vertical partition wall, thereby forming within the vat a first and a second compartments completely isolated respectively together, connecting electric cables for connecting together measuring and delivering stations to at least one central unit being provided to pass from the first to the second compartments between said bottom portion of the vertical partition wall and said bottom of the vat, safety means being further placed in at least one of the first and second compartments for detecting and preventing any explosive mixture or gaseous product fro reaching the delivery station, for controlling maintaining and the level of the neutral liquid above the partition wall to maintain the explosive mixture or gaseous product within the first compartment and for venting the explosive mixture or gaseous mixture or gaseous product to the atmosphere.

2. The siphon according to claim 1, wherein the top of the vat comprises an enlarged rim provided to support a periphery of said cover in order to seal said vat.

3. The siphon according to claim 1, wherein venting means is provided in said at least one of the first and second compartments for venting the explosive mixture or gaseous product to the atmosphere.

* * * * *

UNITED STATES PATENT AND TRADEMARK OFFICE
CERTIFICATE OF CORRECTION

PATENT NO. : 4,612,956

DATED : September 23, 1986

INVENTOR(S) : Coquerel

It is certified that error appears in the above-identified patent and that said Letters Patent is hereby corrected as shown below:

[57] ABSTRACT

Line 1: insert --various-- after "between";
Line 8: change "aqueous" to --upstream--.

IN THE CLAIMS:

Column 4, line 42: change "fro" to --for--;
line 43: add --and-- after "controlling--;
line 44: delete "and" after "ing";
line 47: delete "or gaseous mixture".

Signed and Sealed this

Eleventh Day of August, 1987

*Attest:*

DONALD J. QUIGG

*Attesting Officer*  Commissioner of Patents and Trademarks